United States Patent Office 3,748,304
Patented July 24, 1973

3,748,304
AMIDE-IMIDE COPOLYMERS
James R. Stephens, Naperville, Ill., assignor to Standard Oil Company, Chicago, Ill.
No Drawing. Continuation of abandoned application Ser. No. 79,678, Oct. 9, 1970. This application Mar. 28, 1972, Ser. No. 238,988
Int. Cl. C08g 20/32
U.S. Cl. 260—47 CP        12 Claims

ABSTRACT OF THE DISCLOSURE

Novel copolymers of the amide-imide type are made from approximately equimolar amounts of a mixture of two or more largely- or wholly-aromatic primary diamines and an aromatic polycarboxylic-acid-anhydride derivative. These novel copolymers are useful for preparing enamels, films and molded articles of superior properties.

This application is a continuation of copending application Ser. No. 79,678 filed Oct. 10, 1970, now abandoned.

BACKGROUND OF THE INVENTION

Amide-imide polymers are a relatively new class of substances that are known for their solubility in various organic solvents when in the largely-polyamide form. They can be heat treated to the imide form producing insoluble, inflexible, tough, heat-resistant dielectric materials useful as insulating coatings and impregnating materials. Polymers made from different aromatic primary diamines differ markedly in physical properties. The thermal stability, for example, of polymers made from p,p'-oxybis(aniline) (OBA) and p,p' - sulfonylbis(aniline) (SOBA) is substantially greater than that of polymers made from meta-phenylenediamine (MPDA) and p,p'-methylenebis(aniline) (MBA). Now it has been found that, by combining a mixture of diamines with a polycarboxyl-affording substance to make amide-imide copolymers, novel and unpredictable combinations of useful properties are obtained.

SUMMARY OF THE INVENTION

This invention relates to a novel class of copolymers obtained by reacting a polycarboxylic-acid-anhydride derivative with a mixture of primary diamines. More specifically, it has been found that mixtures of two or more wholly- or largely-aromatic primary diamines when copolymerized with an aromatic tricarboxylic-acid-anhydride derivative form copolymers having novel, unpredictable and usefully superior combinations of properties.

STATEMENT OF THE INVENTION

The polymers of this invention are prepared by reacting an acyl halide derivative of an aromatic tricarboxylic-acid-anhydride with a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7–13,000 as prepared) polymeric compounds having in their molecule units of:

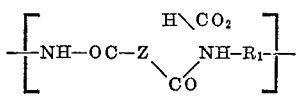

and units of:

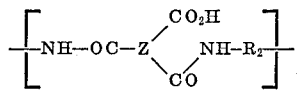

and, optionally, units of:

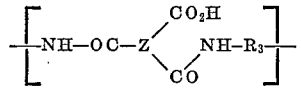

wherein the free carboxyl groups are ortho to one amide group, Z is an aromatic moiety containing 1 to 4 benzene rings or lower-alkyl-substituted benzene rings, $R_1$, $R_2$ and $R_3$ are different and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —$SO_2$—, —S—; for example, —R'—O—R'—, —R'—$CH_2$—R'—, —R'—CO—R'—, —R'—$SO_2$—R'— and —R'—S—R'—.

Said polyamides are capable of substantially complete imidization by heating by which they form the polyamide-imide structure having to a substantial extent reoccurring units of:

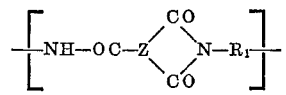

and units of:

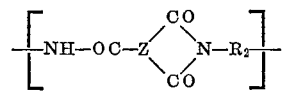

and, optionally, units of:

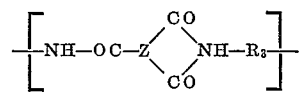

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers of this invention are prepared from an anhydride-containing substance and a mixture of wholly- or partially-aromatic primary diamines. Usefully the anhydride-containing substance is an acyl halide derivative of the anhydride of an aromatic tricarboxylic acid which contains 1 to 4 benzene or lower-alkyl-substituted benzene rings and wherein two of the carboxyl groups are ortho to one another. More preferably, the anhydride-containing substance is an acyl halide derivative of an acid anhydride having a single benzene or lower alkyl substituted benzene ring, and most preferably, the substance is the acyl chloride derivative of trimellitic acid anhydride (4-TMAC).

Usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —$SO_2$—, —CO—, or methylene group. When three diamines are used they are preferably selected from the class composed of:

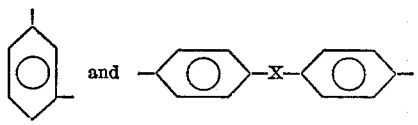

said X being an —O—, —CH₂—, or —SO₂— group. More preferably, the mixture of aromatic primary diamines is two-component and is composed of meta-phenylenediamine and p,p'-oxybis(aniline), p,p'-methylenebis (aniline) and p,p'-oxybis(aniline), p,p'-sulfonylbis(aniline) and p,p'-oxybis(aniline), p,p'-sulfonylbis(aniline) and meta-phenylenediamine, or p,p'-sulfonylbis(aniline) and p,p'-methylenebis(aniline). Most preferably, the mixture of primary aromatic diamines contain meta-phenylenediamine and p,p'-oxybis(aniline). The aromatic nature of the diamines provides the excellent thermal properties of the copolymers while the primary amine groups permit the desired imide rings and amide linkages to be formed.

Usually copolymerization is carried out in the presence of a solvent such as N-methylpyrrolidone, N,N-dimethylformamide, N,N-dimethylacetamide or a complex mixture of phenols and alkyl phenols such as commercially available Cresylic 9PX (Pitt-Consol Chemical Co.), preferably N,N-dimethylacetamide. The reaction should be carried out under substantially anhydrous conditions and at a temperature below about 150° C. Most advantageously, the reaction is carried out from about 20 to about 50° C.

The reaction time is not critical and depends primarily on the reaction temperature. It may vary from about 1 to about 24 hours, with about 2 to 4 hours at about 30 to 50° C. preferred for the nitrogen-containing solvents.

To maintain anhydrous conditions during reaction a slow flow of an inert gas such as nitrogen or argon is used. The flow rate of the gas should be adjusted such that little solvent is removed from the reaction zone.

The mixture of primary diamine-containing substances and the anhydride-containing substance are preferably present in essentially equimolar ratio. However, variations of up to about 2.5 mole percent in either direction do not substantially affect the resulting copolymer. Beyond this percentage in either direction tensile strengths and elongation values decreases substantially.

After formation the copolymer may be used by applying the reaction solution directly, or alternatively, the copolymer may be separated from the reaction solvent and hydrogen halide reaction product by a process such as precipitation.

The presence of the hydrogen halide reaction product is deleterious for some applications and may be eliminated for these applications by going through a separation step as above, or, alternatively, by addition of a cyclic organic oxide such as ethylene or propylene oxide which reacts with the hydrogen halide to form a haloalkanol which is easily volatilized during the later heat treatment (curing) step.

If the copolymer reaction product is to be separated from reaction solvent and hydrogen halide coproduct, a convenient way to effect separation is to precipitate the polymer by admixing the reaction solvent with distilled water and washing with additional distilled water until the wash water has a pH of about 4 to about 5. Undistilled water may be used but the copolymers sorb the cations present in undistilled water which can, if their concentration is sufficiently high, deteriorate the properties of the copolymers.

The initial reaction between the acyl halide derivative of the anhydride and the primary diamine mixture results in a polyamide having an amide content of greater than about 50 percent of the linking units in the polymer. The amide content varies from about 50 percent to about 90 percent and the imide content is about 10 percent to about 50 percent. Such polymeric products are readily soluble in organic solvents such as N-methylpyrrolidone and dimethylacetamide.

The reaction described above is a process for preparing a low to moderate molecular weight solid copolymer having film-forming properties and having solubility in an organic solvent, which process comprises reacting essentially equimolar amounts of an aromatic primary diamine mixture and an acyl halide derivative of an aromatic tricarboxylic-acid-anhydride which contains one acyl halide group in an organic solvent, under substantially anhydrous conditions and for a period of time and at a temperature controlled to produce a copolymer with free carboxyl groups and amide groups available for further reaction, said copolymer being soluble in said organic solvent. Further details of the preparation of the polyamide-imide polymers can be found in Canadian Pat. 756,179.

The properties of the copolymers of this invention depend upon the mole ratio of the largely- or wholly-aromatic primary diamines used and also upon their chemical natures. When three diamines are used in the aromatic primary diamine mixture, it is usual to stay in the concentration range of about 10 mole percent to about 50 mole percent of the total mixture for each one of the three diamines. Preferably, the concentration range is about 30 mole percent to about 40 mole percent of the total mixture for each one of the three diamines used.

When two diamines are used, to achieve a polymer usefully combining the properties of both diamines, it is usual to stay within the range of about 10 mole percent of the first diamine and 90 mole percent of the second diamine to about 90 mole percent of the first diamine and 10 mole percent of the second diamine. Preferably, the range is about a 20 to 80 mole ratio to about an 80 to 20 mole ratio. In the preferred embodiment wherein the acyl chloride of trimellitic acid anhydride is copolymerized with a mixture of p,p'-oxybis(aniline) and meta-phenylenediamine the preferred range is from about 30 mole percent of the former and about 70 mole percent of the latter to about 70 mole percent of the former and about 30 mole percent of the latter.

These copolymers as formed are of low to moderate molecular weight and are capable of further reaction or curing upon application of heat. They may be employed in solution, in high solids' suspension, or as solids in the production of coatings, laminates, films, fibers, molded products and as impregnating varnishes. When used in these applications the largely polyamide form of the copolymers is substantially converted to the polyamide-imide form by a heating step necessary to achieve desirable properties.

In one embodiment of this invention a mixture of the copolymer and a solvent is used to produce coatings. The copolymer is admixed with a solvent such as N-methylpyrrolidone, N,N-dimethylacetamide, N,N-dimethylformamide or Cresylic 9PX, preferably, N,N-dimethylacetamide or a phenol cresol mixture, and made up to concentration range of from about 15 weight percent to about 40 weight percent, preferably about 25 weight percent to about 35 percent by weight copolymer. Such concentrations provide solutions with a good balance between solids content and solution viscosity for ease of handling in most practical applications. The viscosities of such solutions range between about 10 and about 400 poises. In this embodiment it is preferable that the hydrogen halide coproduct is removed by a method such as the ones outlined above prior to use.

In a second embodiment of this invention, free films useful for such purposes as insulating layers were cast from solutions containing copolymers made from two and three primary diamines. Descriptive data for these films is shown in Table I. The intrinsic viscosities of the copolymers of Table I were determined in DMAC at 25° C.

using a Canno-Fenske viscometer (ASTM size No. 100). M.I.T. folding endurance tests were run with a Model 2, M.I.T. tester, which was built by the Tinius Olsen Testing Machine Company, Willow Grove, Pa. All M.I.T. tests were made using a tension of 1 kilogram and with film samples one-half inch in width. Weight average molecular weight values were obtained by equilibrium ultracentrifugation carried out with a Beckman Model E analytical ultracentrifuge equipped with schlierem optics.

TABLE I.—REACTION OF 4-TMAC WITH MIXTURES OF OBA, MBA, AND MPDA

| Diamine mixture | Diamine mixture mole ratio | Final solution viscosity [1] [2] (stokes) | Properties of worked-up polymer [3] | | | | Free film M.I.T. (double folds) [6] |
| --- | --- | --- | --- | --- | --- | --- | --- |
| | | | Solution viscosity [4] (stokes) | Free acid titer [5] | Intrinsic viscosity | Molecular (weight average) | |
| OBAg | | 1,066 | 22(20) | 2.34 | 0.60 | 14,500 | 10-15,000 |
| OBA-MBAg | 1:1 | 275 | 16(20) | 2.40 | 0.54 | 12,500 | 14-18,000 |
| OBA-MBAg | 1:9 | 200 | 120(28) | 2.36 | 0.44 | 12,000 | 5-10,000 |
| OBA-MPDA | 1:1 | 105 | | 2.59 | 0.43 | 9,600 | 2-3,000 |
| OBA-MBA-MPDAg | 1:1:1 | 100 | 7.5(20) | 2.65 | 0.46 | 11,600 | 4-8,000 |
| MBA-MPDAg | 1:1 | 38 | 27(27) | 2.67 | 0.32 | 8,600 | (7) |

[1] Solutions: 27 percent by weight of polymer.
[2] All reactions run in DMAC. 4-TMAC addition 1 hr./35° C. Heated 1 hr./50° C. after addition.
[3] All polymers were precipitated in tap water, washed with distilled water, and then dried without heating.
[4] Bracketed values are weight percentages of the copolymer made up in DMAC solvent.
[5] Theoretical titer for the polyamic acid (unimidized) form of 100% OBA or MBA polymer is 2.70; for a 100% TMAC-MPDA polymer, 3.56.
[6] Films were cured for 30 min./300° F., 3 min./600° F., and then 60 min./250° C. All films were 1.9-200 mills in thickness.
[7] Film flexible but M.I.T. value not measured.

NOTE.—MPDA=Meta-phenylendianiline; OBA=p,p'-Oxybis(aniline'); DMAC=Dimethylacetamide; NMP=methylpyrrolidone; 4-TMAC=trimethyl chloride anhydride In still another embodiment of the instant invention molding powders are made from the copolymers outlined above. These molding powders have superior properties compared to those from a single diamine. For example, polymers made from p,p'-oxybis(aniline) have excellent thermal stability but have molding temperatures high enough to be outside the practical range. Polymers made from m-phenylenediamine have reasonable molding temperatures but require complicated and lengthy heat and solvent treatment prior to molding. The copolymers below are free from both of these difficulties and as molded have additional physical properties which are substantially superior to amide-imide polymers made from a single diamine. In general these copolymers find their greatest current utility as molding powders suitable for the uses of known molding powders.

To convert the copolymers of this invention to molding grade compositions, the critical step of a final heat treatment prior to molding is required. The polymer is heated to a temperature of about 300° F. to about 700° F. for about 0.5 to about 5 hours, preferably from about 500° F. to about 600° F. for about 1 to about 2 hours for the copolymer from the acyl chloride of trimellitic acid anhydride, p,p'-oxybis(aniline) and meta-phenylenediamine. This treatment provides the molecular weight increase necessary for good copolymer properties and also more completely imidizes the polymers. Typically, at this point molecular weights are substantially above 30,000 to 40,000. Additionally, this heating is necessary to prevent water evolution later in the molding step which would cause formation of voids in the molded item. Typically, amide-imide type polymers when converted to molding powders have required extensive treatment with water and a nitrogen-containing organic solvent for up to 8 hours (c.f., Ser. No. 755,432). Thus, the heat treatment required for preparing molding grade amide-imide copolymers is substantially less than that required for preparing molding grade amide-imide polymers.

Molding conditions for the copolymers vary with the type of mold used and with the size and configuration of the molded pieces A typical molding schedule for compression molding of small items is given in Table II.

TABLE II

Compression molding schedule—copolymer from 4-TMAC, MPDA and OBA (1.) Preheat mold [2] in press to 600 to 625° F.
(2.) Charge cold molding copolymer [3] to the mold and press according to the following molding schedule. A 78 gram charge gives a 5½ inch diameter x ⅛ inch disc:

| | Pressure, tons | Time, minutes | Pressure, p.s.i. |
| --- | --- | --- | --- |
| 1 | 2½ | 10 | 210 |
| 2 | 10 | 4 | 840 |
| 3 | 25 | 3 | 2,100 |
| 4 | 50 | 3 | 4,200 |
| 5 | 25 | 5 | 2,100 |

[1] See Table I for the meaning of the abbreviations.
[2] Mold hardware is 5½ inch diameter I.D. x 8½ inch O.D. and 1¾ inch thick.
[3] Heat treated prior to molding at 550° F. for 1 hour.

(3.) The mold and contents are cooled to 500° F. under pressure (25 tons) and the molded specimen ejected immediately.

The copolymers can be charged cold to the mold and conditioned to temperature equilibrium in the mold or oven-heated prior to molding at about 500° F. Usefully, molding temperatures of from about 200° F. to about 750° F. at pressures of about 200 p.s.i. to about 30,000 p.s.i. are used. More preferably, molding temperatures of from about 400° F. to about 750° F. at pressures of about 200 p.s.i. to about 25,000 p.s.i. are used and, most preferably, the molding temperature range is from about 600° F. to about 700° F. at pressures of about 1,000 p.s.i. to about 20,000 p.s.i.

In the preferred embodiment wherein the copolymer is made from trimellitoyl chloride anhydride, meta-phenylenediamine and p,p'-oxybis(aniline) the preheat treatment is carired out at about 500° F. to about 600° F. and usefully molded in the temperature range from about 200° F. to about 700° F. at pressures of about 200 p.s.i. to about 30,000 p.s.i. More preferably, molding is accomplished in the temperature range from about 400° F. to about 700° F. at about 200 p.s.i. to about 25,000 p.s.i. and, most preferably, the temperature range is from about 600° F. to about 700° F. at pressures of about 1,000 p.s.i. to about 20,000 p.s.i.

Injection molding requires higher temperatures and the copolymer is normally injected into a mold maintained at about 500° F. A one minute mold cycle is used with a barrel temperature of about 650° F. to about 670° F. These conditions, however, depend upon the size of the injection molding equipment.

A series of copolymers was prepared from p,p'-oxybis(aniline) and m-phenylene diamine using different diamine mole ratios and tensile strength and elongation data measured on molded products obtained therefrom. This data is tabulated in Table III along with solution properties and preparative conditions for the copolymers. It may be seen from the table that tensile strength values for the molded copolymers peak at 22,240 p.s.i. at a 40/60 OBA/MPDA ratio, but are excellent up to a mole ratio of OBA/MPDA of about 70/30. A similar effect is noted with the elongation data which maximize at about a mole ratio of OBA/MPDA of 60/40. Beyond the 70/30 OBA/MPDA mole ratio it can be seen from consideration of Table III that the tensile strengths and elongation values fall off rapidly. Hence, a practical upper limit is set on the mole ratio of OBA/MPDA used. In addition to the decline of tensile strengths and elongation values with diamine composition for the molded copolymer the molded article becomes opaque above about a 70/30 mole ratio of OBA/MPDA.

TABLE IV

Flow Property Comparison [1] Chrome-plated mold

Polymer type: [2]          Mold closure time, minutes
    MPDA: 100 mole percent _____ 8
    OBA/MPDA: 60/40 mole ratio _____ 0.5

[1] Molding temperature: 660° F.; molding pressure: 5,000 p.s.i. A preheat of the molding powder of 5 minutes at 500° F. was used.
[2] Polymers made from 4-TMAC.

Heat distortion temperature under load has also been determined for both AI-11 (MPDA) polymer and AI-copolymer. With the improved flow characteristics of the AI-copolymer, a lower heat distortion temperature was expected. This was not the case, however. Both polymer systems are rated at 535° F. under 164 p.s.i. load by ASTM method D-648-56. Thus, the excellent copolymer molding and flow properties have not been obtained at the expense of thermal properties.

TABLE III.—SUMMARY OF COPOLYMER PREPARATION AND MOLDING

| Diamine mole ratio, OBA/MPDA | Reaction conditions | | | | | Molded specimen [3] | | Comments |
|---|---|---|---|---|---|---|---|---|
| | Temperature, °C. | Additional, hours | Total hours | Viscosity [1] | Viscosity [2] | Tensile strength, p.s.i. | Elongation (percent) | |
| 0/100 | 30 | 4 | 6 | 46 | 55 | 19,680 | 7.8 | |
| 10/90 | 40 | 2 | 28 | | 33 | | | |
| 40/60 | 30 | 4 | 5 | 15 | 95 | 22,240 | 12.0 | |
| 60/40 | 30 | 4 | 4.5 | 15 | 175 | 19,850 | 13.7 | |
| 70/30 | 30 | 4 | 4.3 | 26,100 | 148 | 19,430 | 13.0 | |
| 85/15 | 25 | 1.25 | 1.5 | 15-30 | 61 | 9,900 | 4.2 | Non-homogeneous and non-transparent. |
| 100/0 | 25 | 1.5 | 1.75 | 15-30 | 69 | 4,650 | 2.0 | Opaque molding. |
| 100/0 | 30 | 4.0 | 4.25 | 46.3 | 148 | | | Do. |
| 60/40 | 30 | 3.5 | 4.25 | Average 32-130 | 60 | 20,489 | 15.0 | |
| 60/40 | 30 | 3.5 | 5.25 | 130 | 250 | 20,552 | 15.00 | |
| 60/40 | 30 | 3.5 | 6.5 | 30,100 | 94 | | | |
| | | | | | | 21,153 | 12.9 | Cured at 1 hour at 500° F. |
| 60/40 | 30 | 3.7 | 4.8 | 30,250 | 130 | 19,667 | 13.4 | Do. |
| 50/50 | 30 | 3.5 | 5.0 | 25-205 | 140 | 19,070 | 10.7 | Do. |
| 70/30 | 30 | 3.5 | 5.0 | 38 | 148 | 20,495 | 13.8 | Do. |

[1] In poises as made, 26 percent by weight solution in DMAC at 25° C. (Brookfield).
[2] In poises as reformulated, 32 percent by weight solution in 3:1 NMP/DMAC at 25° C. (Brookfield).
[3] Molding powder heat treated according to S.N. 755,432. Tensile strengths and elongations were measured according to ASTM D-638.

NOTE.—See Table I for the meaning of the abbreviations.

As an indication of the improved thermal stability of molded articles made from the instant copolymer compositions as opposed to those made from a single diamine, aging experiments have shown that molded articles from a copolymer composition with a 70/30 OBA/MPDA ratio which are heated 2,000 hours at 500° F. show a 91 percent retention of tensile strength. This is to be compared with similar data from measurements on molded articles made from 4-TMAC and MPDA after being heated 2,000 hours at 500° F. The tensile strength of a molded item to which 5 percent of Teflon (the completely fluorinated analogue of polyethylene) was added showed only a 78 percent retention of tensile strength.

Polymer flow properties at molding temperature are remarkably improved by utilizing the copolymer compositions. This improvement yields a decided advantage when molding objects of intricate shape and for extrusion or transfer molding fabrication. An estimate of the comparative plastic flow of a 60/40 OBA/MPDA copolymer and the polymer derived from MPDA alone was obtained by use of a modified ASTM method, D-731-57. In this method as modified a cup mold of the flash type is used and the rate of closure of the mold is measured. The heated mold is filled with a measured weight of preheated material which has been previously found to fill the cup. The test involves measuring the time between the start of pressure build-up to the complete closure of the mold. This time is sensitive to the type of mold surface and in Table IV it can be seen that using chrome-plated surfaces mold closure times were reduced from 8 minutes to one-half minute when the copolymer was used. Greater polymer flow occurs at still lower OBA ratios, but polymer softening temperature is then below the "high temperature" polymer range.

The following examples illustrate preferred embodiments of this invention. It will be understood that these examples are for illustrative purposes only and do not purport to be wholly definitive with respect to conditions or scope of the invention.

EXAMPLE I

A 690 gram portion of dimethylacetamide was stirred and cooled to 5° C. with dry nitrogen purging to keep the system dry. An intimate mixture composed of 252.7 grams of 4-TMAC, 119.0 grams of p,p'-methylenebis-(aniline), and 12.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC was then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained. A solution of the copolymer suitable for preparing enamels was formulated by admixing 300 grams of the copolymer made above and a mixture of 300 grams of DMAC and 600 grams of N-methylpyrrolidone (NMP). The solution resulting had a viscosity of 10 poises. When spread on 24-gauge copper panels with a doctor blade and baked for two minutes at 600° F. in a circulating air oven, a clear continuous coating that withstood at least 160 inch lbs. of reverse impact resulted.

EXAMPLE II

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP was added to wash in all solids, then the reaction mixture was heated to 50° C. and held at that temperature for 3½ hours. The solution was then filtered. The solution was then used directly to coat a copper panel using the procedure in Example I. The resulting coating was substantially equivalent in properties to the one prepared in Example I.

EXAMPLE III

The general procedure for preparing a copolymer containing three diamines is illustrated by the reaction of OBA, MPDA and MBA and 4-TMAC in DMAC. Thus, a 242.0 gram portion of OBA (1.21 moles) a 130.7 gram portion of MPDA (1.21 moles) and a 239.6 gram portion of MBA (1.21 moles) were dissolved in 3,900 grams DMAC contained in a 6 liter flask equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33–38° C. for the remainder of the 4-TMAC addition, using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° for 90 minutes and then the solution precipitated by admixing with water. Prior to precipitation the solution viscosity was about 7.5 stokes (25° C., 20 percent solids). The polymer was precipitated in distilled water in a model D, W. J. Fitzpatric Company, comminuting machine (Fitz mill). After precipitation the polymer was washed with distilled water to aqueous pH 4 to 5 (3 to 4 hours washing time), then filtered onto large Büchner funnels. The polymer was dried overnight by drawing air through the funnels, then finally dried in an aeromat drier at 30°–35° for 12–15 hours. See Table I for other properties of this copolymer.

Preparation of free films

Polymer solutions were spread on glass panels and cured in circulating hot air ovens for 30 minutes at 350° F. and then 3 to 5 minutes at 600° F. When exceptionally smooth, blister-free, films were required, an initial treatment in a vacuum oven at 80° C. was also used. Films could usually be directed stripped from the glass panels. In cases where stripping was difficult, soaking the panels in warm water for several minutes, gave easier film release. Polymer solutions were spread or doctored onto the panels with a variety of home-made and commercial applicators. Most often used were 3" Bird film application bars. Properties of free films cast from the copolymer of this example are shown in Table I. The thermal stability of the free film cast from the copolymer of this example was reduced from that of free films cast from a polymer made from 4-TMAC and OBA.

EXAMPLE IV

Reaction was carried out in a 5 gallon Pfaudler kettle equipped with nitrogen purge, stirrer, addition funnel and thermocouple. p,p'-oxybis(aniline) (5.70 lbs., 12.9 moles) and meta-phenylenediamine (1.32 lbs., 5.53 moles) were dissolved in 34.8 lbs. of dimethylacetamide. 4-trimellitoyl chloride anhydride, 8.55 lbs. (18.42 moles) in flake form was then added in portions to diamine solution over three and one-half hours. The reaction exotherm was allowed to raise the temperature to 30° C. and this temperature was maintained for the remainder of the 4-TMAC addition. Cooling water was used as needed. After 4-TMAC addition was complete, stirring was continued at 30° C. until the solution viscosity reached 30 poises when measured at 25° C. The reaction mixture was then drained from the reactor and copolymer precipitation begun immediately to minimize viscosity increase. The polymer was precipitated in distilled water in a Model D, W. J. Fitzpatric Co., comminuting machine (Fitz mill) over a period of 1 to 2 hours. Solution viscosity increased 120 to 150 poises during this period. After precipitation, the copolymer was washed with distilled water to a pH of 4 to 5 in a centrifuge (1 to 2 hours washing time) and the washed material was then spun dry. The polymer was then dried over several days in a vacuum oven at 50° C. Water content, determined by weight loss at 500° F. (20 minutes), was 7 to 10 percent. At this point the dried polymer reformulated in a 3 to 1 NMP/DMAC mixture had a solution viscosity of 120 poises at 25° C. and was 30 to 40 percent in the imide form.

EXAMPLE V

A 78 gram amount of the copolymer in powdered form made in Example I was heated at 550° F. for about 1 hour. It was then cooled and charged cold into a mold preheated in the press to about 600° to about 650° F. A minimum pressure of 4,200 p.s.i. was applied over a 25 minute period and thereafter the mold and contents cooled to 500° F. under a pressure of 2,100 p.s.i. and the molded item immediately ejected. A disk measuring 5½ inches in diameter and ⅛ inch thick had been formed.

What is claimed is:

1. As a composition of matter, a copolymer capable of film forming consisting essentially of units of:

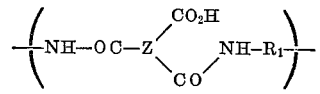

and units of:

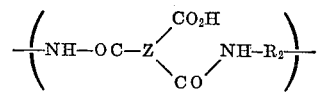

wherein the free carboxyl groups are ortho to one amide group, Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —C—, —$SO_2$— and —S— radicals and wherein said $R_1$ and $R_2$ containing units run from about 10 mole percent $R_1$ containing unit and about 90 mole percent $R_2$ containing unit to about 90 mole percent $R_1$ containing unit to about 10 mole precent $R_2$ containing unit.

2. As a composition of matter, a copolymer capable of film forming consisting essentially of units of:

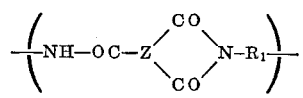

and units of:

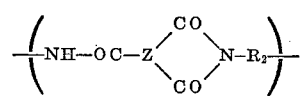

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said R$_1$ and R$_2$ containing units run from about 10 mole percent R$_1$ containing unit and about 90 mole percent R$_2$ containing unit to about 90 mole percent R$_1$ contaning unit and about 10 mole percent R$_2$ containing unit.

3. As a composition of matter, a copolymer capable of film forming consisting essentially of A units of:

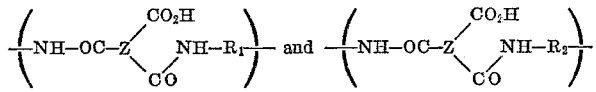

wherein the free carboxyl groups are ortho to one amide group and B units of:

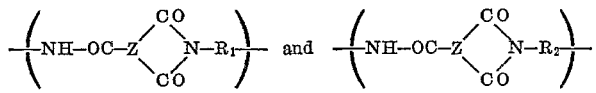

wherein one carbonyl group is meta to and one carbonyl group is para to each amide group and wherein Z is a trivalent benzene ring or lower-alkyl-substituted trivalent benzene ring, R$_1$ and R$_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$— and —S— radicals and wherein the proportions of A and B units run from about 1 mole percent A units and about 99 mole percent B units to about 99 mole percent A units and about 1 mole percent B units and wherein the R$_1$ and R$_2$ containing components of the A and B units run from about 10 mole percent R$_1$ containing components and about 90 mole percent R$_2$ containing components to about 90 mole percent R$_1$ containing components and about 10 mole percent R$_2$ containing components.

4. The copolymer of claim 1 wherein R$_1$ is

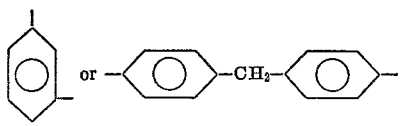

and R$_2$ is

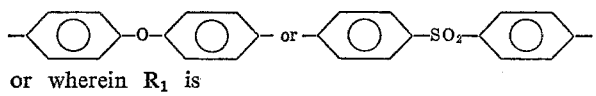

or wherein R$_1$ is

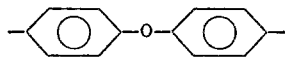

and R$_2$ is

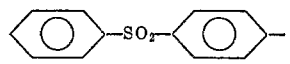

5. The copolymer of claim 2 wherein R$_1$ is

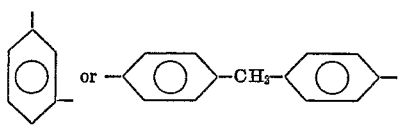

and R$_2$ is

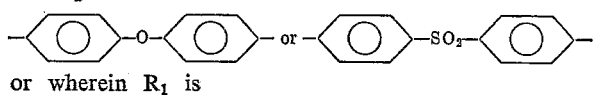

or wherein R$_1$ is

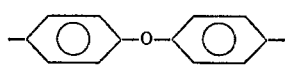

and R$_2$ is

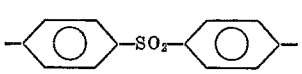

6. The copolymer of claim 3 wherein R$_1$ is

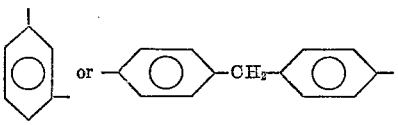

and R$_2$ is

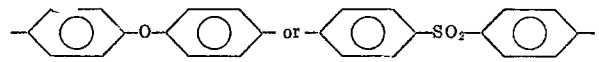

or wherein R$_1$ is

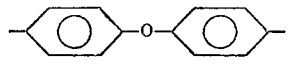

and R$_2$ is

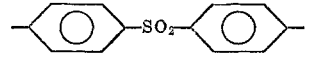

7. The copolymer of claim 1 wherein Z is a trivalent benzene ring, R$_1$ is

R$_2$ is

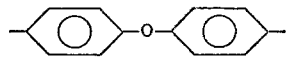

and wherein concentration range runs from about 30 mole percent of the R$_1$ containing units and about 70 mole percent of the R$_2$ containing units to about 70 mole percent of the R$_1$ containing units and about 30 mole percent of the R$_2$ containing units.

8. The copolymer of claim 2 wherein Z is a trivalent benzene ring, R$_1$ is

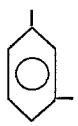

R$_2$ is

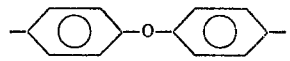

and wherein the concentration range runs from about 30 mole percent of the R$_1$ containing units and about 70 mole percent of the R$_2$ containing units to about 70 mole percent of the R$_1$ containing units and about 30 mole percent of the R$_2$ containing units.

9. The copolymer of claim 3 wherein Z is a trivalent benzene ring, R$_1$ is

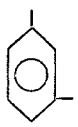

R$_2$ is

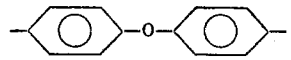

and wherein the concentration range runs from about 30 mole percent of the R$_1$ containing components and about 70 mole percent of the R$_2$ containing components to about 70 mole percent of the R$_1$ containing components and about 30 mole percent of the R$_2$ containing components in both the A and B units.

10. The copolymer of claim 1 which contains in addition reoccurring units consisting essentially of:

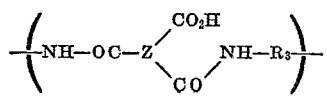

wherein $R_3$ is different than either $R_1$ or $R_2$ but is defined as are $R_1$ and $R_2$ and wherein the $R_1$, $R_2$ and $R_3$ contaniing units run from about 10 mole percent of the $R_1$ containing unit and about 40 to about 50 mole percent each of the $R_2$ and $R_3$ containing units to about 50 mole percent of the $R_1$ containing unit and about 10 to about 40 mole percent each of the $R_2$ and $R_3$ containing units.

11. The copolymer of claim 2 which contains in addition reoccurring units consisting essentially of:

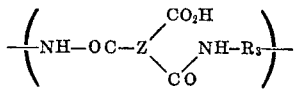

wherein $R_3$ is different than either $R_1$ or $R_2$ but is defined as are $R_1$ and $R_2$ and wherein the $R_1$, $R_2$ and $R_3$ containing units run from about 10 mole percent of the $R_1$ containing unit and about 40 to about 50 mole percent each of the $R_2$ and $R_3$ containing units to about 50 mole percent of the $R_1$ containing units and about 10 to about 40 mole percent each of the $R_2$ and $R_3$ containing units.

12. The copolymer of claim 2 which contains in addition reoccurring A units consisting essentially of:

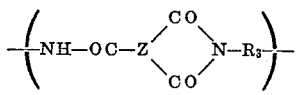

and reoccurring B units consisting essentially of:

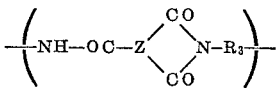

wherein $R_3$ is different than either $R_1$ or $R_2$ but is defined as are $R_1$ and $R_2$ and wherein the $R_1$, $R_2$ and $R_3$ components of the A and B units run from about 10 mole percent $R_1$ containing components and about 40 to about 50 mole percent each of the $R_2$ and $R_3$ containing components to about 50 mole percent of the $R_1$ containing components and about 10 to about 40 mole percent each of the $R_2$ and $R_3$ containing components.

References Cited
UNITED STATES PATENTS

| 3,260,691 | 7/1966  | Lavin et al.    | 260—30.2 |
| 3,494,890 | 2/1910  | Morello         | 260—47   |
| 3,546,152 | 11/1970 | Bolton          | 260—29.2 |
| 3,392,144 | 7/1968  | Holub           | 260—46.5 |
| 3,347,828 | 10/1967 | Stephens et al. | 260—47   |

WILLIAM H. SHORT, Primary Examiner

L. L. LEE, Assistant Examiner

U.S. Cl. X.R.

117—161 P; 161—227; 260—30.2, 32.6 N, 33.4 P, 65, 78 T F

UNITED STATES PATENT OFFICE
CERTIFICATE OF CORRECTION

Patent No. 3,748,304  Dated March 28, 1972

Inventor(s) James R. Stephens

It is certified that error appears in the above-identified patent and that said Letters Patent are hereby corrected as shown below:

| | | |
|---|---|---|
| COLUMN 1 - LINE 70 | ---------- | $H/CO_2$ should be $CO_2H$ |
| COLUMN 3 - LINE 47 | ---------- | decreases should be decrease |
| COLUMN 5, LINE 1 | ---------- | Canno should be Cannon |
| COLUMN 5, LINE 13 | ---------- | "g" should be deleted in headings under Diamine mixture |
| | ---------- | Under heading "free film..." 2-3,000 should be 2-3,600 |
| | ---------- | Under NOTE: 4-TMAC-trimethyl should be trimellitoyl |
| COLUMN 7, LINE 20 | ---------- | Table III <u>Viscosity</u> |

26,100 should be 36-000
30,100 should be 30-100
30,250 should be 30-250

<u>Elongation</u>

15.00 should be 15.0

| | | |
|---|---|---|
| COLUMN 9, LINE 52 | ---------- | directed should be directly |
| COLUMN 9, LINE 71 | ---------- | to diamine should be to the diamine |

PATENT NUMBER   3,748,304                     PAGE    2

Column 10, line 26  ----------  minimum should be  maximum

Column 10, line 51  ----------  -C- should be  -CO-

Column 11, line 6   ----------  containng should be  containing .

Signed and sealed this 18th day of December 1973.

(SEAL)
Attest:

EDWARD M. FLETCHER, JR.                RENE D. TEGTMEYER
Attesting Officer                      Acting Commissioner of Patents